SINGLE CHANNEL NRZI DETECTION CIRCUIT

Filed Jan. 24, 1961 6 Sheets-Sheet 1

INVENTOR
ALFRED BRUNSCHWEIGER

BY Sughrue, Rothwell, Mion & Zinn
ATTORNEYS

Sept. 21, 1965 A. BRUNSCHWEIGER 3,207,915

SINGLE CHANNEL NRZI DETECTION CIRCUIT

Filed Jan. 24, 1961 6 Sheets-Sheet 3

Sept. 21, 1965 A. BRUNSCHWEIGER 3,207,915

SINGLE CHANNEL NRZI DETECTION CIRCUIT

Filed Jan. 24, 1961 6 Sheets-Sheet 6

3,207,915
Patented Sept. 21, 1965

3,207,915

SINGLE CHANNEL NRZI DETECTION CIRCUIT

Alfred Brunschweiger, Poughkeepsie, N.Y., assignor to International Business Machines Corporation, New York, N.Y., a corporation of New York Filed Jan. 24, 1961, Ser. No. 84,736
11 Claims. (Cl. 307—88.5)

Figure 1:
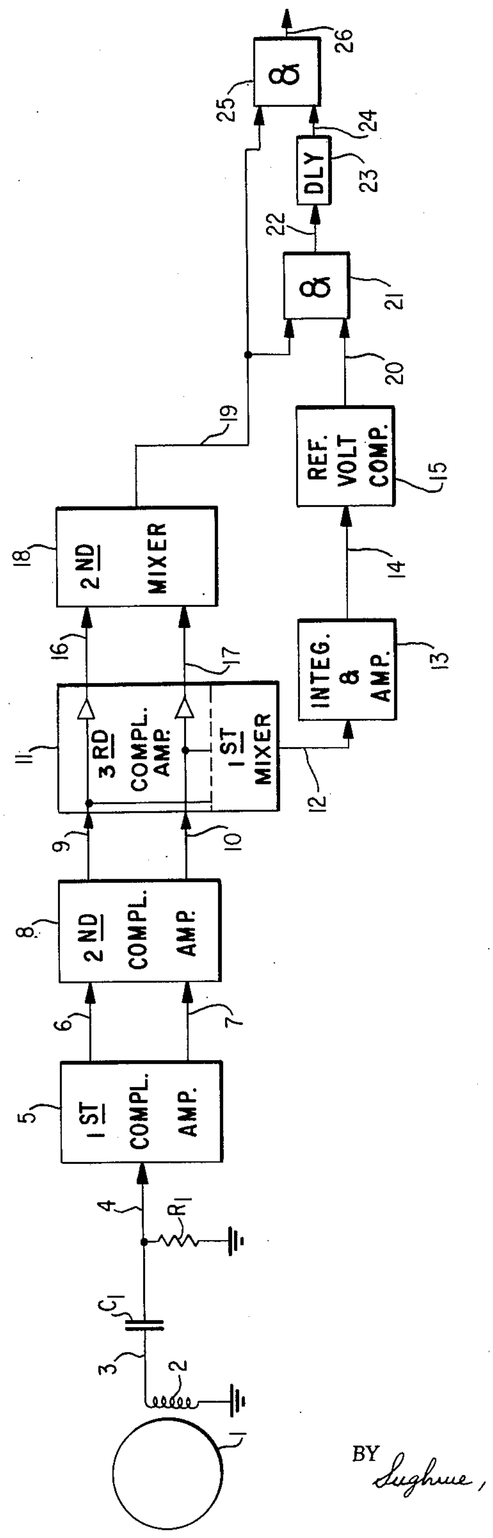

This invention relates to a storage information read circuit, and more particularly, to a single channel read circuit for recovery of information coded by a modified non-return-to-zero method.

A popular form of information storage in digital computers and other data processing systems has been a magnetizable storage medium having an associated recording head or writing head with relative motion therebetween to which are applied current pulses for the purpose of magnetizing in one direction or the other various discrete incremental areas on the surface itself. Such a storage, which may be in the form of a drum or tape, admirably adapts itself to the recording of binary information since the two binary digits "1" and "0" may be conveniently represented by any of several different flux patterns. For example, the writing of a binary "1" digit may be accomplished by the presence of a current pulse in one direction through the recording head during a portion of a clocked digit time interval, while the writing of a "0" digit is indicated during the digit time interval by the absence of any current pulse. This results in the magnetization in one direction of an incremental portion of the storage surface which happens to be adjacent to the recording head at the time that the current pulse flows therein, while no magnetization occurs of the surface area which is adjacent the recording head when no current pulse is present. This is commonly known as the return-to-zero method of recording. A variation on the above scheme is often employed in which the "0" binary digit is represented by a current pulse in a direction through the recording head opposite to that representing binary "1." In this method, each incremental area as it passes the recording head will be magnetized in one direction or the other depending upon the direction of the current pulse through the head at that particular time. In all forms of the return-to-zero method of recording, the current in the write head always falls to zero magnitude between each pulse, where it remains for a substantial length of time until the next following clocked digit interval occurs during which a binary digit is to be recorded.

The return-to-zero method of recording has certain basic limitations, among which is that the binary digit, or bit density, on the storage medium is relatively low. This is so because the fringing effect of a write head normally causes the flux pattern of each current pulse to overlap adjacent storage areas on the magnetic surface as the bit frequency is increased. Since the read circuitry normally must be able to distinguish each discrete flux pattern, i.e., by noting two changes of flux, or by a change of flux in the same direction for a binary digit, there obviously is a limit as to the amount of overlap which can be present, and consequently, a limit as to the bit density. If high bit density is required, then the non-return-to-zero method of recording is very often utilized, wherein the current in the recording head never remains at a value of zero between the digit time intervals, but remains continuously flowing in one predetermined direction for all successive digit time intervals in which the same binary digit is to be recorded. When the opposite binary digit is to be recorded, the current in the head changes to continuously flow in the opposite direction for all successive intervals having this opposite digit, until a digit time interval is reached wherein there is again a change in the binary digit. Thus, in the non-return-to-zero method of recording, a series of adjacent binary "1" digits will cause the current in the recording head to flow continuously therethrough without being reduced to zero between each of the binary "1" digits. When a binary "0" digit is detected in the information train, the current immediately reverses in direction and flows through the recording head continuously for as long as the binary "0's" are to be successively recorded. Therefore, a change in the value and direction of current within the head only occurs upon the following of a binary "1" by a binary "0," or vice versa. This results in a flux pattern on the magnetic storage whereby no areas thereon are in an unmagnetized condition, since the current in the head ideally never remains at zero for any measurable length of time, but only quickly passes through zero during its reversal of direction. Thus, more binary digits per unit length may be stored since it is not necessary for a change of flux to occur for each digit.

A modified version of the non-return-to-zero method of recording above described is to reverse direction of the current flow in the recording head each time that a binary "1" digit is to be recorded. However, no change in the value of direction of writing current is produced whenever a binary "0" bit is to be recorded. In this manner then, a reversal of the flux pattern on the magnetic storage surface is only experienced at the time that a binary "1" is written. Consequently, only one change of flux, in either direction, need be detected by the read circuitry in order to distinguish binary digits. It is then retrieval of binary information expressed in this modified non-return-to-zero form to which the present invention is peculiarly adapted. It provides means for producing output pulses which are indicative of each binary "1" digit of the information train, and which are accurately timed so that they can be satisfactorily clocked by the data processing system in which they will be utilized. The invention contains means for effectively discriminating between valid binary digit signals from storage and any noise signals which may be introduced into the system.

It is therefore an object of the present invention to provide new and novel means for reading information represented by modified non-return-to-zero signals without allowing undue noise to be gated through to the data processing system.

Another object of the present invention is to provide means for sensing information signals and excluding noise signals which includes apparatus for examining each of said signals and comparing them with certain criteria.

Another object of the present invention is to provide a signal sensing circuit for modified non-return-to-zero binary information signals wherein the zero crossover points of said signals are detected with a minimum of noise interference.

A yet further object of the present invention is to provide a signal sensing circuit wherein each change of signal slope is detected and indicated only if said signal is valid information.

Another object of the invention is to provide means for sensing information in modified non-return-to-zero signal form wherein the true and complement waveforms of said signal are obtained which are employed to determine the zero crossover point of said information signal, with further means for determining that each information signal is of a minimum width and amplitude in order to prevent noise from passing through the system.

Another object of the present invention is to provide an information signal sensing unit responsive to an input electrical signal thereto, comprising means for differentiating said input signal, means for phase inverting said differentiated signal, first means responsive to both said differentiated signal and said phase inverted signal for determining the zero crossover points of said differentiated signal, second means responsive to both said differentiated signal and said phase inverted signal for determining the width and amplitude of the positive and negative portions of said differentiated signal, and gating means responsive to outputs from said first and second means for generating a third output signal indicative of the information content of said input signal.

Figure 2A:
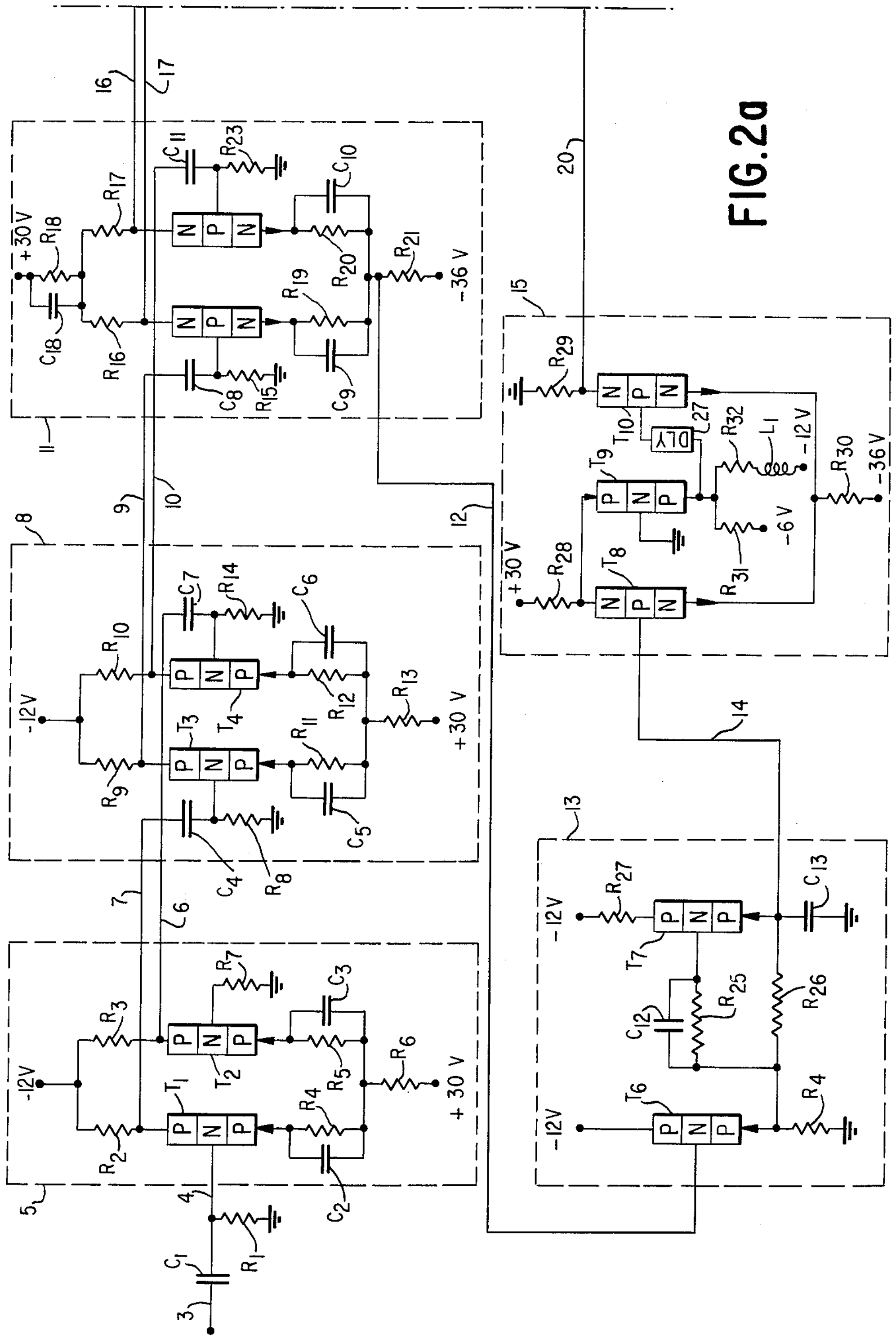
Figure 3:
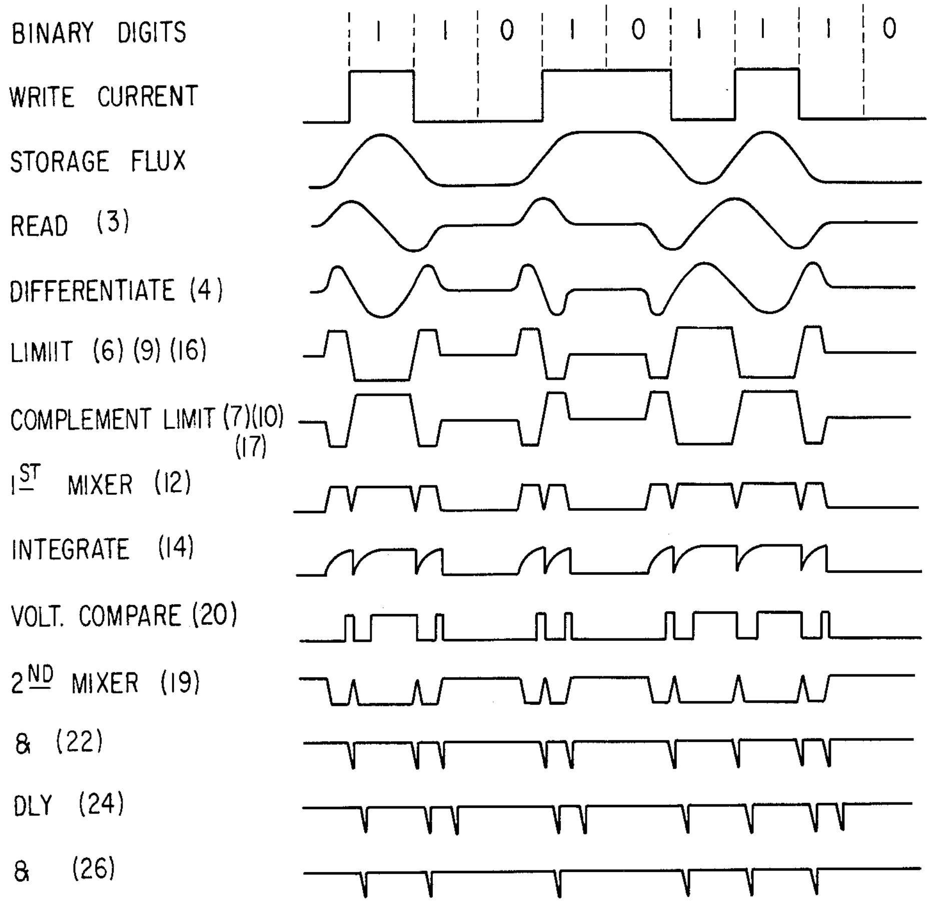
Figures 4A, 4B:
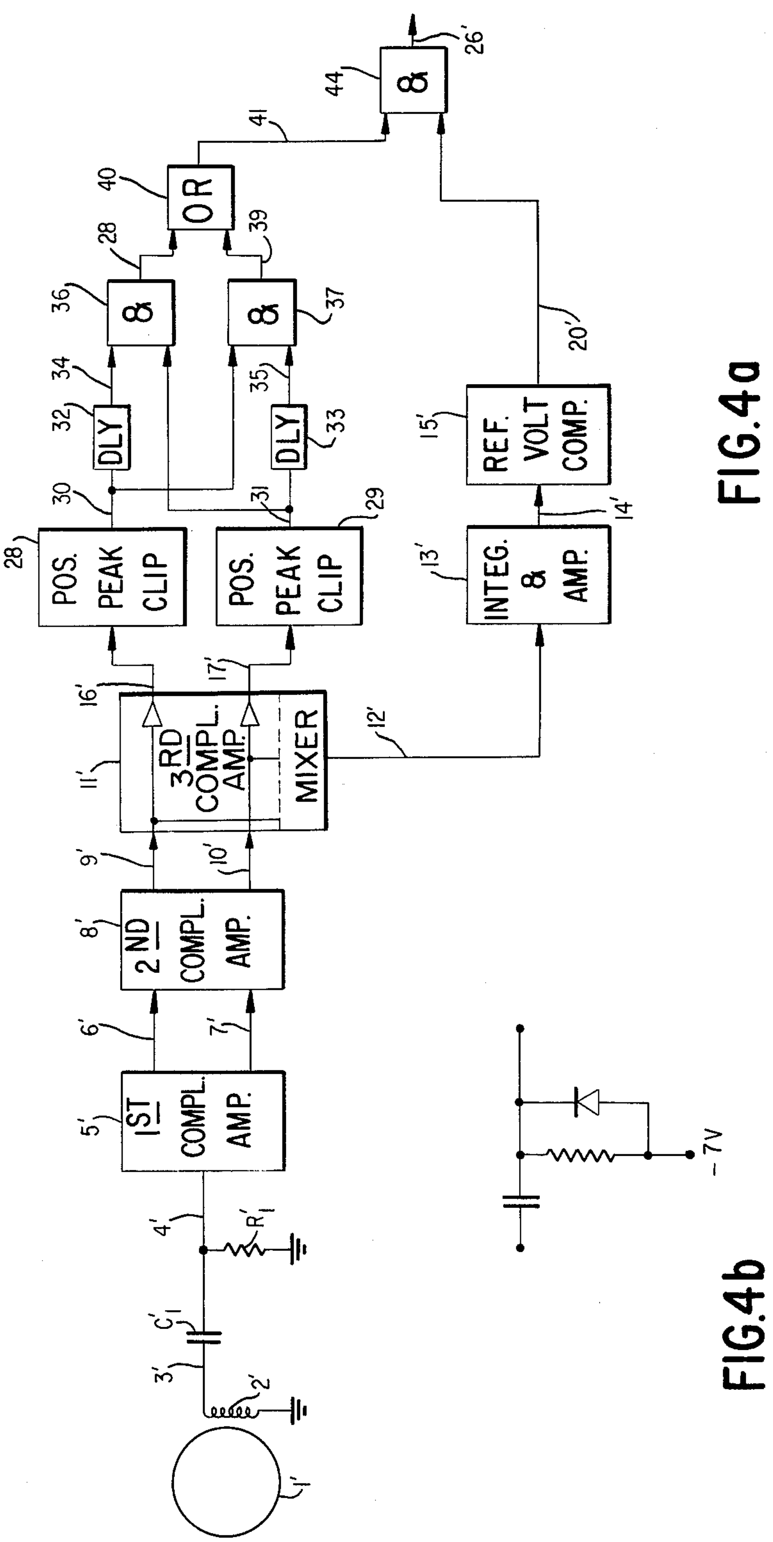

These and other objects of the invention will be apparent from the discussion in the following specification, when taken with the accompanying drawings, in which:

FIGURE 1 shows a functional block diagram of one embodiment of the present invention;

FIGURES 2 and 2*a* disclose the schematic circuit diagram of the embodiment of FIGURE 1;

FIGURE 3 shows signal waveforms obtained at various points in the system of FIGURE 1;

FIGURE 4*a* discloses a functional block diagram of another embodiment of the present invention;

FIGURE 4*b* shows a typical clipping circuit used in FIGURE 4*a*; and

Figure 5:
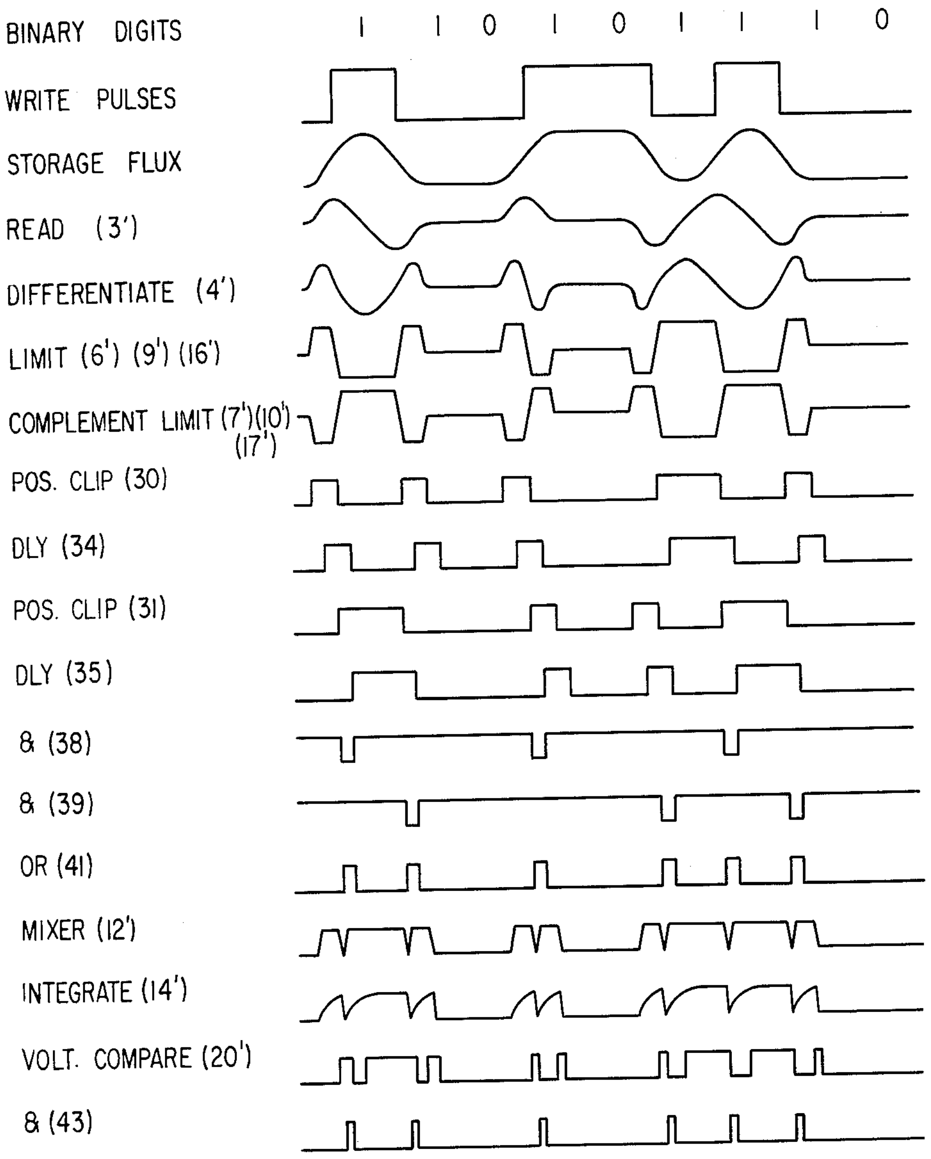

FIGURE 5 shows various waveforms obtained at points throughout the system of FIGURE 4*a*.

Referring now to FIGURES 1 and 3, one embodiment of the present invention will be generally described. Numeral 1 indicates a typical magnetic storage medium, such as a drum or tape, having a magnetizable surface with relative motion existing between it and a pickup, or read winding 2. On the track surface 1, which is associated with pickup head 2, is stored a train of binary information such as is indicated in the first row of FIGURE 3. Each digit storage location on surface 1 is magnetized in one direction or the other in accordance with the modified non-return-to-zero method of recording. When writing on surface 1 with a write head (not shown), the current through that head may flow in either of two directions as represented by the polarity of current with respect to the reference line in FIGURE 3. Each time that a binary "1" is written onto surface 1, the current in the write head must reverse in direction. However, whenever a binary "0" digit is to be stored, no change occurs in the direction of the current through the write head. It may be appreciated, therefore, that each time a binary "1" digit is stored on the surface 1, the write current passes very quickly through zero. The distribution and magnitude of the flux on surface 1 in an ideal storage system would also be of a square wave configuration similar to and coincident with the current distribution in the write head. However, as is shown by the flux pattern waveform in the third row of FIGURE 3, its slope when changing is not of infinite value because of the fringing characteristics of the recording head. However, it is still noted that each zero crossover point of the flux waveform indicates that binary "1" digit is present in the train of information.

In order to retrieve information from the magnetic surface 1, the usual technique is to provide constant relative motion between surface 1 and the pickup, or read, head 2. This motion causes the lines of flux of the magnetized incremental areas of the surface to cut pickup head 2 so as to produce a voltage therein which is proportional in both amplitude and polarity to the rate of flux change. Since motion is constant, the rate of flux change depends upon the rate at which the magnetization of the surface varies, which is indicated by the flux pattern in FIGURE 3. The waveform (row 4 of FIGURE 3) appearing on conductor 3 from pickup head 2 is therefore indicative of the differentiated storage flux waveform, since it has zero magnitude wherever the peaks of the storage flux waveform are found, and has maximum magnitude wherever the rate of change in the storage flux is the greatest, which is approximately at the zero crossover point of the storage flux waveform. It may therefore be observed from FIGURE 3 that the waveform on conductor 3 has as many loops as there are zero crossover points in the flux pattern, with the polarity of each loop being determined by the polarity of the flux waveform slope at these zero crossover points.

The differentiated flux waveform signal on conductor 3 is next applied to a differentiating circuit consisting of capacitor $C_1$ and resistor $R_1$ so that the output on conductor 4 is indicative of the double differentiated flux waveform. This is shown in row 5 of FIGURE 3. This differentiation of the electrical signal from head 2 is necessary in both the embodiments of FIGURE 1 and FIGURE 4*a* in order for these circuits to correctly interpret binary information coded by the modified non-return-to-zero method. The waveform on conductor 4 is applied to a first complementing and limiting amplifier 5 wherein it is amplified and clipped so as to appear on conductor 6 in the form shown in row 6 of FIGURE 3. As may be seen, the voltage waveform on conductor 6 now consists of a series of positive and negative substantially square wave portions having the same polarity as the positive and negative loops of the signal apeparing on conductor 4. Furthermore, a phase inversion also occurs in amplifier 5 which complements the input signal from conductor 4 and simultaneously amplifies and limits the complemented signal so that a resulting waveform appears on conductor 7 such as is shown in row 7 of FIGURE 3. This waveform also consists of a series of positive and negative square wave portions having opposite polarities from those appearing on conductor 6. The waveforms on conductors 6 and 7 are applied to a second complementing and limiting amplifier 8 wherein both true and complement versions of the inputs appear respectively on conductors 9 and 10. In like fashion, these waveforms are applied to a third complementing amplifier and limiter 11 which again produces the true and complement versions of the inputs on conductors 16 and 17, respectively. In the present embodiment, three complementing amplifiers are used so that the final output waveforms on conductors 16 and 17 more truly approximate square wave shape. However, for the sake of simplicity, rows 6 and 7 of FIGURE 3 indicate the same waveforms emerging from all the amplifiers.

The above described limiting action of amplifiers 5, 8, and 11 is only performed on so called "nominal" signals appearing from head 2. "Nominal" is here defined to be the normal signal which can be expected to be produced by head 2 from the information flux pattern on the storage surface. "Normality" may be defined in terms of signal amplitude and width. However, diminution of signal strength may occur due to several factors such as dirt on the read head, and variations in the relative motion between the magnetic surface and the head. Therefore, because the detection of each binary digit in digital information is essential in order to correctly interpret the complete word or message, the present system is designed to also read information signals which may be as little as 10% of the nominal value. Since noise spikes and "grass" may approach the value of these less than nominal information signals, however, the amplification factors of 5, 8, and 11 cannot be so high as to cause the limiting and shaping of such small information signals since the same function would also be performed on noise signals and consequently the signal to noise ratio from the outputs of the amplifiers would be about equal to "1." Therefore, the output waveforms on conductors 6, 7, 9, 10, 16 and 17 are not valid for signals much smaller than the nominal value.

The third complementing amplifier 11 also provides a mixing action whereupon a third output on conductor 12 is obtained which is the result of rectifying the true waveform appearing on conductor 9 to that amplifier. No amplifying and limiting action occurs at conductor 12 from this first mixer. This waveform is shown in row 8 of FIGURE 3 where it will be observed that nearly square wave loops of voltage are provided of the same polarity, the number of which correspond to the total number of positive and negative square wave loops contained in the signals appearing on either conductor 9 or conductor 10. However, for signals which are much less than nominal value, the output pulses on conductor 12 are not of square wave configuration since such signals have not been limited by amplifiers 5 and 8 as previously explained. The waveform emanating from the first mixer will, in all cases, indicate by its most negative potential the zero crossover points of the waveform appearing on conductor 4. These rectified pulses are fed to an integrator and amplifier circuit 13 where they are sampled to see if they are of a predetermined minimum width and amplitude. The beginning of the leading edge of each pulse on conductor 12 causes a resistor capacitor circuit to commence charging from a reference potential and the trailing edge of the pulse causes the integrator to rapidly discharge to the reference potential. The output voltage from integrator 13 appears on conductor 14 and is shown in row 9 of FIGURE 3. Thus, if each pulse on conductor 12 is sufficiently wide and high enough, the voltage on conductor 14 will reach a second reference potential. However, if a pulse appearing on conductor 12 is too narrow, or if its amplitude is not great enough, then its trailing edge will appear before the integrator has had time to reach the second reference potential. If the voltage on conductor 14 from integrator 13 reaches the second reference potential, a reference voltage compare circuit 15 thereupon provides an output pulse to conductor 20. This integrator and compare circuit combination allows detection of noise spikes, which in the vast majority of cases, are more narrow or have less amplitude than any valid binary signal which is recovered from storage medium 1, including those information signals which are as little as 10% of nominal value. Such noise signals, when differentiated by either the read head or the circuit of $C_1$ or $R_1$, or if introduced someplace in amplifiers 5 or 8, will not cause the generation of a pulse from circuit 15.

The true and complement waveforms appearing from amplifier 11 on conductors 16 and 17, respectively, are directed to a second mixer 18, the output of which appears on conductor 19. Mixer 18 utilizes the true and complement input signals in order to rectify the true signal in a manner similar to the rectification of the true signal appearing on conductor 9 by mixer 11. However, as can be seen from FIGURE 3, the waveform appearing on conductor 19 has rectified pulses of opposite polarity to those rectified pulses on conductor 12. By opposite polarity here is meant that the output of conductor 19 is high except in the presence of positive or negative pulses appearing on conductor 16, whereas on conductor 12, the output is low except in the presence of positive or negative pulses on conductor 9. The most positive potential of this waveform on conductor 19 indicates the zero crossover points of the waveform on conductor 4.

The pulses on conductor 19 are fed to one input of an AND gate 21 which has its other input connected to conductor 20 upon which appear the pulses from comparator 15. AND gate 21 generates a significant low output on conductor 22 upon the coincidence of high signals from mixer 18 and comparator 15. This may be observed in row 12 of FIGURE 3. The output from conductor 22 is next delayed by delay 23, after which the delayed signal is again combined with the output from mixer 18 at AND gate 25. AND gate 25 is so constructed that it generates a significant low signal on conductor 26 in response to the simultaneous presence of two low signals at its inputs. Thus, as shown in FIGURE 3, only certain of the low signals from delay 24 coincide with the low portions of the signal from mixer 19. The end result at output conductor 26 is shown in row 14 of FIGURE 3 to be a series of negative pulses equal in number and identical in position to the number and position of the "1" digits contained in the information stored on surface 1. Furthermore, all negative output pulses exactly appear with the same ordinal positions of their associated flux patterns. Therefore, this system may be said to be self clocking, since no separate train of clock pulses is necessary within the read circuit. Thus, conductor 26 produces negative signals indicative of the position of each binary "1" stored in the information train, and the absence of signals on conductor 26 during a unit time interval is indicative that binary "0" is present here.

Having now briefly explained the general organization and function of the embodiment of FIGURE 1, FIGURES 2*a* and 2*b* will now be described, since they show the details of one kind of circuit for performing the functions described above. Those elements in FIGURES 2*a* and 2*b* which are also shown in FIGURE 1 have been correspondingly numbered. Furthermore, dotted lines surround various groups of components in FIGURES 2*a* and 2*b* which comprise the contents of each of the blocks in FIGURE 1, and these dotted blocks have also been correspondingly numbered.

In FIGURE 2*a*, the first complementing limiting amplifier 5 is shown comprised of two PNP transistors $T_1$ and $T_2$ which are connected so as to have a common emitter resistor $R_6$. The base region of $T_1$ is connected to conductor 4 so as to receive the differentiated signal from $C_1$ and $R_1$. The base region of $T_2$ is connected to ground via $R_7$. A positive signal applied to base $T_1$ increases its resistance and reduces the current flow therethrough in the usual manner so as to reduce its collector voltage. Thus, the voltage on conductor 4 is phase inverted by 180° with the complemented signal appearing on conductor 7. When the current flow through $T_1$ is reduced, the excess current is diverted to the emitter of $T_2$ which results in a larger current through its collector resistor $R_3$ so as to provide a positive going potential on conductor 6. Therefore, the output waveform on conductor 6 is not inverted or complemented with respect to input at conductor 4. The amplifying and limiting characteristics of the circuit are due to the particular values of its components, with representative values for this embodiment being given subsequently in the specification.

In like fashion, the second complementing and limiting amplifier 8 is comprised of transistors $T_3$ and $T_4$ which are connected and operate in the same manner as $T_1$ and $T_2$. Both $T_3$ and $T_4$ amplify, limit, and phase invert the nominal signals applied at their respective bases so that the output on conductor 9 is true with respect to the input on conductor 4, while the output on conductor 10 is complementary.

The third complementary amplifier limiter11 is comprised of two NPN transistors which are connected with their emitters being biased negatively through a common resistor $R_{21}$, while their collectors are biased positively through a common register $R_{18}$. Each transistor at its collector amplifies, limits and phase inverts the signal applied to its base so that the output signals on conductors 16 and 17 are the true and complementary versions, respectively, of the input at conductor 4. The mixing action of amplifier 11 is accomplished at its common emitter resistor $R_{21}$ whereby the signal appearing on conductor 9 is effectively rectified into a series of positive pulses having their peak at approximately ground potential if the input signals thereto have been limited. This is accomplished in the following manner. When both signals applied to the bases of the transistors are approximately at ground potential (in other words, at the zero crossover points), current flow through the transistor is approximately equal, and the total current through $R_{21}$ is such that conductor 12 is at a negative potential. Upon the signal to a first one of the transistors becoming more positive and the signal to the second transistor simultaneously becoming more negative, the total resistance of the parallel transistors becomes less and results in greater current flow through $R_{21}$ so as to raise the potential of conductor 12 closer to ground. Conversely, if a positive signal is applied to the second transistor while an equally negative signal is applied to the first transistor, the current through $R_{21}$ increases in a like amount. This may be observed in FIGURE 3 whereby the output on conductor 12 from the first mixer is always more positive whenever the input signals thereto on conductors 9 and 10 have positive or negative loops.

The integrator 13 is comprised of two PNP transistors $T_6$ and $T_7$ together with capacitor $C_{13}$. Conductor 12 from the first mixer is connected to the base of $T_6$ which acts merely as an emitter follower. When conductor 12 is below ground, $T_6$ conducts and thus applies a negative potential across resistor $R_{24}$ to one side of $C_{13}$ via $R_{26}$ and to the base of $T_7$ via $R_{25}$. In the stable condition of circuit 13, $T_7$ is non-conducting since the same negative potential is simultaneously applied to both its base and emitter. Furthermore, at this time a negative potential of similar magnitude exists across $C_{13}$, whose other terminal is connected to ground. When the output of the first mixer 11 begins to go positive, the potential across resistor $R_{24}$ also rises toward ground. This applies a positive going voltage spike across speed-up capacitor $C_{12}$ to the base of $T_7$, which maintains it in its non-conducting state. At the same time, however, $C_{13}$ begins to discharge toward ground so that the voltage appearing on conductor 14 rises. When the output from mixer 11 begins a negative travel, $T_6$ begins to conduct more heavily and the base of $T_7$ is driven negatively via $C_{12}$ so as to cause it to also turn on, thereby driving its emitter down to a negative potential and thus establishing a quick charging path therethrough so as to reinstate the negative potential across $C_{13}$. This action is observable from the waveforms of FIGURE 3, which show that the potential on conductor 14 rises whenever a positive or negative signal is applied to mixer 11.

Conductor 14 is connected to the reference voltage comparator circuit 15 which consists of three transistors $T_8$, $T_9$ and $T_{10}$ connected as shown in FIGURE 2*a*. The emitters of NPN transistors $T_8$ and $T_{10}$ are connected to a negative potential via $R_{30}$. PNP transistor $T_9$ has its emitter connected to the collector of $T_8$, while its base is grounded. Output conductor 20 is connected to the collector $T_{10}$ while the base of this transistor is connected via DLY 27 to the collector of $T_9$.

In operation, $T_9$ is normally conducting, and the voltage across $R_{31}$ also maintains $T_{10}$ in the conducting state. The conduction of $T_{10}$ causes the potential on output conductor 20 to be down while at the same time $T_8$ is turned off. The high potential at the collector of $T_8$ therefore maintains $T_9$ in its conducting state. Upon $C_{13}$ discharging toward ground, $T_8$ eventually turns on if the potential of conductor 14 reaches a second reference voltage near ground potential. Whether or not this second reference potential is reached depends upon the width of the pulse applied to the integrator, and also upon its amplitude. Most of the current that had been flowing through $T_9$ now suddenly begins to flow through $T_8$. Since the collector of $T_8$ is at +30 volts and the collector of $T_{10}$ is at ground, the turn on of $T_8$ will also decrease the amount of current flowing through $T_{10}$ since it substantially raises the potential at the emitter of $T_{10}$ by virtue of increased current flow through $R_{30}$. Furthermore, the decreased amount of current flowing through $T_9$ causes its collector to go more negative. Because the collector of $T_9$ is tied to the base of $T_{10}$, the combination of the decrease in current through $T_{10}$ and the decrease in the voltage applied through its base cuts it off completely. This causes the collector of $T_{10}$ to rise sharply to a more positive potential, in this case ground. Thus, as may be observed in FIGURE 3, the leading edge of a positive pulse is generated by the compare unit whenever the integrator produces a voltage equal to a minimum reference potential. As before stated, this will occur only when the width and amplitude of each positive or negative signal to mixer 1 meets certain minimum requirements. However, the circuits are designed so that valid information signals down to 10% of nominal value will cause compare circuit 15 to generate a pulse.

Figure 2B:
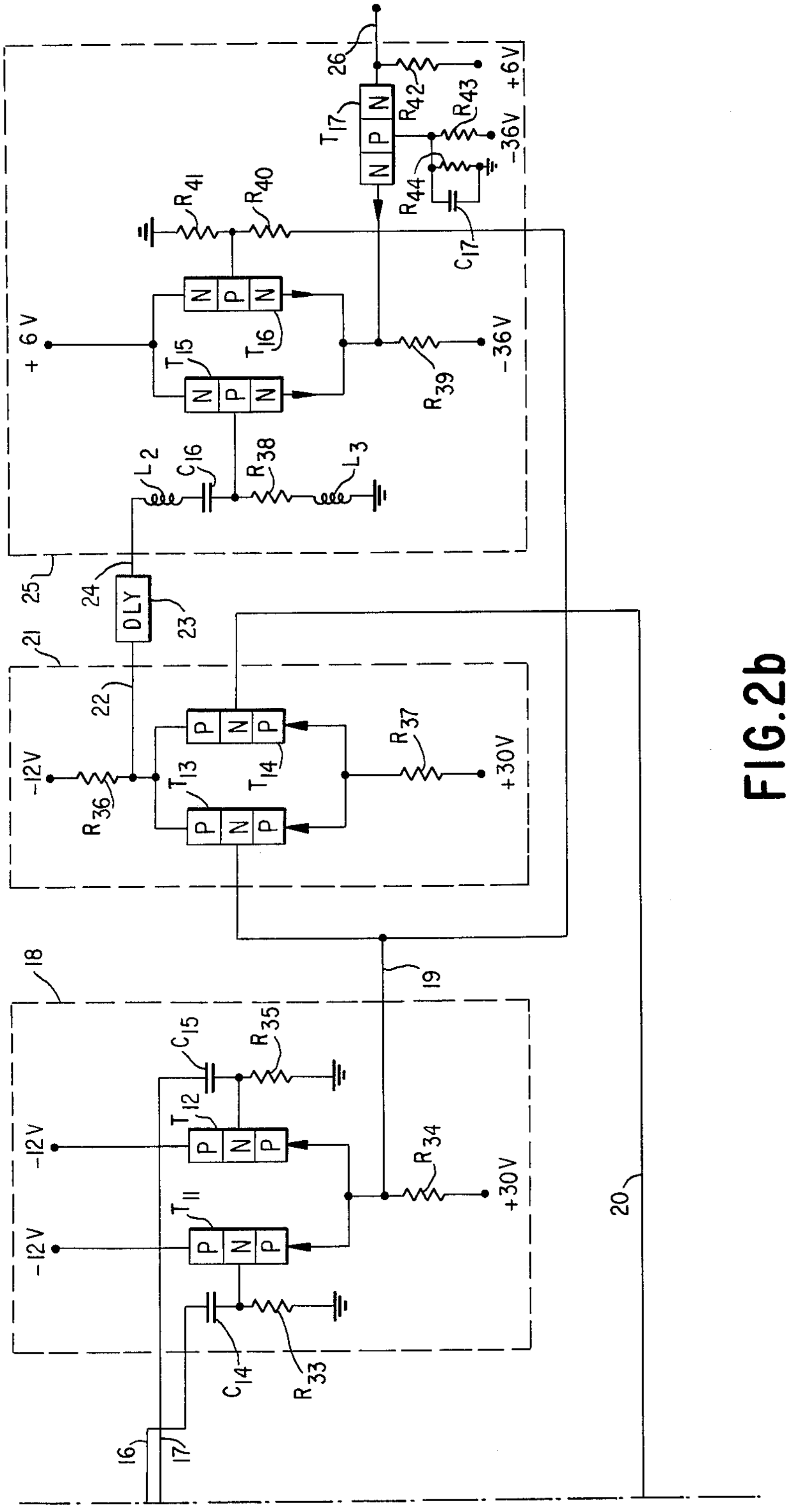

In FIGURE 2*b*, the true and complement voltage waveforms on conductors 16 and 17, respectively, are applied to the second mixer 18 comprising transistors $T_{11}$ and $T_{12}$ connected so as to have a common emitter resistor $R_{34}$. As previously noted, the purpose of the second mixer is to also rectify the positive and negative voltage waveforms applied to its inputs. However, a series of negative going pulses are generated from this mixer instead of to the series of positive going pulses generated from first mixer 11. The output conductor 19 is connected to the common emitter terminal. At conditions of zero crossover for both of the input waveforms to mixer 18, that is, when the bases of the transistors are approximately at ground potential, minimum current flows through $T_{11}$ and $T_{12}$ so as to maintain their emitters at approximately ground potential. Upon a negative going signal being applied to the base of $T_{11}$, its resistance is decreased. Although the positive going signal at the base of $T_{12}$ increases its resistance, the overall resistance of the parallel combination is less so as to result in a larger current flow through $R_{34}$. The voltage at conductor 19 thereupon drops where it remains until the input waveforms pass through zero. This action may be observed in FIGURE 3.

The outputs from mixer 18 and compare circuit 15 are applied to AND circuit 21 shown in FIGURE 2*b*. This circuit comprises two PNP transistors $T_{13}$ and $T_{14}$ connected with common collector and emitter resistances $R_{36}$ and $R_{37}$, respectively. Output conductor 22 is connected to the common collector point. The significant voltage waveform from AND circuit 21 is a negative going pulse, which occurs only upon the concurrence of two positive going signals at the two inputs. A negative signal applied to a base of $T_{13}$ and $T_{14}$ causes that transistor to conduct and so raise the potential at the common collector point. Either or both transistors conducting will cause the potential of conductor 22 to be high. Therefore, the resistance of both transistors must be increased, or in other words, the current flow through each must be reduced in order to lower the potential at the common collector terminal. As can be seen in FIGURE 3, the negative going pulse on conductor 22 is the result of the overlap between the two positive going pulses appearing from voltage compare circuit 15 and the second mixer 19.

The negative going pulse on conductor 21 is fed to delay line 23 which is of such electrical length so as to insure that its output pulse coincides with the negative peaks of the rectified voltage pulses from mixer 19. This relationship is more clearly shown in FIGURE 3. Conductor 24 from delay 23 is connected to AND circuit 25 as is the output from mixer 19. As has been previously described, delay 23 is necessary in order to obtain a true representation of the number and position of binary "1" digits in the information train.

AND circuit 25 comprises in part two NPN transistors $T_{15}$ and $T_{16}$ connected to common emitter resistor $R_{39}$. The significant output signal from AND 25 is a negative going pulse which results from the simultaneous occurrence of two negative going signals to the bases of the transistors. The collectors of $T_{15}$ and $T_{16}$ are further connected to the emitter of an NPN transistor $T_{17}$ which provides a negative going pulse at output terminal 26 in response to a negative going signal at its emitter.

When $T_7$ in FIGURE 2*a* begins to conduct, thus reestablishing the negative voltage on $C_{13}$, $T_8$ is turned off so that $T_9$ will begin to again conduct. The positive going signal from the collector of $T_9$ is passed via DLY 27 to the base of $T_{10}$ which enables it to conduct, thus decreasing its collector voltage. The insertion of DLY 27 prevents the trailing edge of the pulse from compare circuit 15 from ending until the output from mixer 18 appears.

Another way of accomplishing the same function might be to delay the output from compare circuit 15 so as to cause the overlap at AND gate 21 to occur at or near the leading edge of the pulse on conductor 20.

One major advantage of the embodiment shown in FIGURE 1 is that the same integrating and compare circuit is used to sample both the positive and negative portions of the signal appearing on conductor 4. Thus, any asymmetry of this checking circuit is introduced equally into the positive and negative peaks which generate the compare pulse to be recombined with the output of the second mixer 18 at AND gate 21.

A second embodiment of the present invention is disclosed in FIGURE *4a,* along with its associated waveforms in FIGURE 5. Many of the circuit components in FIGURE *4a* are the same as those shown in FIGURE 1, and are therefore correspondingly indicated with primed numbers. The basic change in FIGURE *4a* is the elimination of the second mixer 18 shown in FIGURE 1 and the substitution therefor of positive peak clippers 28, 29, delay lines 32, 33, AND gates 36, 37, OR gate 40. Also, AND gate 44 replaces the gating circuit combination of AND gates 22, 25, and delay 23 found in FIGURE 1. The positive peak clippers 28 and 29 allow only the positive portions of the true and complementary voltage waveforms, respectively, to be gated therethrough. This is shown on rows 8 and 10 of FIGURE 5, wherein both clippers also move the reference voltage below ground. A circuit for accomplishing this function is shown in FIGURE *4b*. Delays 32 and 33 are both equal in electrical length and adjusted so as to provide the overlap described below. The delayed true positive peaks on conductor 34 are now combined with the complementary positive peaks on conductor 31 in AND gate 36. Also at the same time, the delayed complementary positive peaks on conductor 35 are combined with the true positive peaks on conductor 30 in AND gate 37. The outputs from these two AND gates may be observed in rows 12 and 13 of FIGURE 5. It should be noted that a negative going pulse appears on conductor 38 from AND gate 36 whenever the storage flux waveform has a positive slope at its zero crossover point. Conversely, conductor 39 has a negative going pulse whenever the slope of the storage flux waveform is negative at its zero crossover point. The delays 32 and 33 should therefore be adjusted so as to provide this indication. As previously noted, each zero crossover point of the storage flux line indicates that a binary "1" was written in the modified non-return-to-zero system of recording. The outputs of both AND gates 36 and 37 are combined in OR gate 40 so that the output on conductor 41 is a series of positive going pulses each denoting the presence and position of a binary "1" digit in the information train.

Although a certain amount of noise-free operation is inherent in the arrangement of FIGURE *4a,* it has been found that noise spikes are still produced from OR gate 40. Therefore, further noise suppression is provided by integrating circuit 13' and reference voltage compare circuit 15' together with a mixer in amplifier 11'. The operation of these circuits is analogous to the operation of those shown in FIGURE 1, and their waveforms are also disclosed in FIGURE 5. As may be observed, the output of compare 15' is a series of variable width positive going pulses. These output pulses on conductor 20' are combined at AND gate 44 with the output from OR gate 40. Therefore, a pulse from OR gate 40 will only be transmitted to output conductor 26' if the integrating and compare circuit has determined that it is a valid information bit. Because the output from OR gate 40 represents the true binary information, neglecting noise, a simple AND gate 44 replaces the relatively complicated gating circuit shown in FIGURE 1 which was necessary to correctly interpret the signal emanating from mixer 18. AND circuits 36, 37 and 44, and OR circuit 40 is believed to be obvious to one skilled in the art after reviewing the particular circuit details of the first embodiment as shown in FIGURES *3a* and *2b*. For example, AND circuits 36, 37 and 44 may be constructed as is AND circuit 21 in FIGURE *2b*. OR circuit 40 in FIGURE *4a* may also be constructed as is AND circuit 21 since it receives negative going inputs in order to produce a positive going output. It can be seen that AND circuit 21 in FIGURE *2b* supplies this logic because the presence of a negative going signal at either one of the transistor bases causes a positive going signal to appear at their common collector points.

Representative values for the components of FIGURES *2a* and *2b* are given in the following table. However, the invention is not to be limited to circuits employing these values.

$R_1$, $R_7$=500 ohms
$R_2$, $R_3$, $R_{16}$, $R_{17}$=5.1K ohms
$R_4$, $R_5$, $R_{11}$, $R_{12}$, $R_{19}$, $R_{20}$, $R_{36}$=1.5K ohms
$R_6$, $R_{21}$, $R_{43}$=15K ohms
$R_8$, $R_{14}$=2.2K ohms
$R_9$, $R_{10}$=4.53K ohms
$R_{15}$, $R_{23}$=2.21K ohms
$R_{33}$, $R_{35}$=7.5K ohms
$R_{34}$=18K ohms
$R_{26}$=3K ohms
$R_{25}$=300 ohms
$R_{31}$, $R_{32}$=1K ohms
$R_{30}$=7.2K ohms
$R_{29}$=400 ohms
$R_{37}$=6.2K ohms
$R_{38}$, $R_{40}$, $R_{41}$=1.6K ohms
$R_{39}$=9.1K ohms
$R_{42}$=510 ohms
$R_{44}$=180 ohms
$C_1$=160 mmf.
$C_2$, $C_3$, $C_5$, $C_6$, $C_9$, $C_{10}$, $C_{17}$, $C_{18}$=30 micro f.
$C_4$, $C_7$, $C_8$, $C_{11}$, $C_{14}$, $C_{15}$, $C_{16}$=10 micro f.
$C_{12}$=330 mmf.
$C_{13}$=390 mmf.

While only two representative embodiments of the invention disclosed herein have been outlined in detail, there will be obvious to those skilled in the art many modifications and variations accomplishing the foregoing objects and realizing many or all of the advantages, but which do not depart essentially from the spirit of the invention, as expressed in the appended claims. Furthermore, the invention is not limited to recovering information from a magnetic storage medium, but may be used to interpret electrical signals generated by other means.

What is claimed is:

1. An information signal sensing unit responsive to an input electrical information signal applied thereto comprising: means for differentiating said input signal, means for phase inverting said differentiated signal, first means responsive to the separate and simultaneous application of said differentiated signal and said phase inverted signal for generating a first output signal, second means responsive to the separate and simultaneous application of said differentiated signal and said phase inverted signal for generating a second output signal, and a gating circuit responsive to the separate and simultaneous application of said first and second output signals for generating a third output signal indicative of the information content of said input signal.

2. An information signal sensing unit according to claim 1 in which said second means comprises a first mixer responsive to both said differentiated signal and said phase inverted signal for generating a variable signal, integrating means responsive to said variable signal for generating a signal indicative of the energy content of said variable signal, and comparing means responsive to said signal from said integrating means for generating said second output signal.

3. An information signal sensing unit according to claim 2 in which said first means comprises a second mixer circuit for generating said first output signal so that it is phase inverted with respect to said variable signal from said first mixer.

4. An information signal sensing circuit according to claim 3 in which said gating circuit comprises first AND gate means responsive to both said first and said second output signals for generating an intermediate signal, means for delaying said intermediate signal, and second AND gate means responsive to said second output signal and said delayed signal for generating said third output signal.

5. An information signal sensing unit according to claim 2 in which said first means comprises means for delaying each of said differentiated and phase inverted signals, first AND gate means responsive to said delayed differentiated signal and said phase inverted signal, second AND gate means responsive to said delayed phase inverted signal and said differentiated signal, and OR gate means responsive to outputs from said first and second AND gate means for generating said first output signal.

6. An information signal sensing unit responsive to an input electrical information signal applied thereto, comprising means for differentiating said input signal, means for phase inverting said differentiated signal, first means responsive to both said differentiated signal and said phase inverted signal for generating a first output signal indicative of the zero crossover points of said differentiated signal, second means responsive to both said differentiated signal and said phase inverted signal for generating a second output signal indicative that said differentiated signal has a minimum energy content, and a gating circuit responsive to said first and second output signals for generating a third output signal indicative of the information content of said input signal.

7. An information signal sensing unit according to claim 6 in which said second means includes a first mixer responsive to both said differentiated signal and said phase inverted signal for rectifying said differentiated signal, integrating means responsive to said rectified signal for generating a signal indicative of the energy content of said rectified signal, and comparing means responsive to a certain value of said signal from said integrating means for generating said second output signal.

8. An information signal sensing unit according to claim 7 in which said first means comprises a second mixer for rectifying said differentiated signal and generating said first output signal so that it is phase inverted with respect to said rectified signal from said first mixer.

9. An information signal sensing unit according to claim 8 in which said gating circuit comprises first AND gate means responsive to both said first and said second output signals for generating an intermediate signal, means for delaying said intermediate signal, and second AND gate means responsive to said second output signal and said delayed signal for generating said third output signal.

10. An information signal sensing unit responsive to an input electrical signal representing information which comprises meas for differentiating said input signal, means for phase inverting said differentiated signal, means responsive to both said differentiated signal and said phase inverted signal for determining the zero crossover points of said differentiated signal and generating a first output signal indicative thereof, means responsive to both said differentiated signal and said phase inverted signal for rectifying said differentiated signal, means responsive to said rectifying means for integrating said rectified signal, comparing means responsive to a particular magnitude of said integrated signal for generating a second output signal, and a gating circuit responsive to said first output signal and said second output signal for generating a third output signal indicative of the information content of said input signal.

11. An information signal sensing unit responsive to an input electrical information signal applied thereto comprising: means for differentiating said input signal, means for phase inverting said differentiated signal, means for delaying each of said differentiated and phase inverted signals, first AND gate means responsive to the separate and simultaneous application of said delayed differentiated signal and said phase inverted signal, second AND gate means responsive to the separate and simultaneous application of said delayed phase inverted signal and said differentiated signal, and OR gate means responsive to the separate outputs from said first and second AND gate means for generating an output signal indicative of the information content of said input signal.

References Cited by the Examiner

UNITED STATES PATENTS

| | | | |
|---|---|---|---|
| 2,448,718 | 9/48 | Koulicovitch | 328—132 |
| 2,506,770 | 5/50 | Braden | 328—127 X |
| 2,729,809 | 1/56 | Hester | 340—174.1 |
| 2,864,077 | 12/58 | DeTurk | 340—174.1 |
| 2,892,945 | 6/59 | Ule | 328—127 |
| 2,915,746 | 12/59 | Prims | 328—127 X |
| 2,972,735 | 2/61 | Fuller et al. | 340—174.1 |
| 3,011,128 | 11/61 | Filipowsky | 328—127 X |

OTHER REFERENCES

Terman: "Electronic and Radio Engineering," 4th edition, by McGraw-Hill (1955), pages 256 and 257.

ARTHUR GAUSS, *Primary Examiner.*

IRVING L. SRAGOW, GEORGE N. WESTBY, *Examiners.*